United States Patent

Naraoka et al.

[11] Patent Number: 6,108,467
[45] Date of Patent: Aug. 22, 2000

[54] OPTICAL SWITCH

[75] Inventors: Seiichi Naraoka, Ichihara; Makoto Okuda, Chiba; Yoshitaka Enomoto, Mito, all of Japan

[73] Assignees: The Furukawa Electric Co. Ltd.; Nippon Telephone and Telegraph Corporation, both of Tokyo, Japan

[21] Appl. No.: 09/097,045

[22] Filed: Jun. 12, 1998

[30] Foreign Application Priority Data

Oct. 16, 1996 [JP] Japan ................................. 8-294592

[51] Int. Cl.[7] .................................................. G02B 6/26
[52] U.S. Cl. ................................ 385/20; 385/16; 385/24
[58] Field of Search .................................. 385/20, 16–24

[56] References Cited

U.S. PATENT DOCUMENTS

| | | | |
|---|---|---|---|
| 5,446,810 | 8/1995 | Watanabe et al. | 385/22 |
| 5,832,149 | 11/1998 | Omizu et al. | 385/20 |
| 5,920,665 | 6/1999 | Presby | 385/16 |

FOREIGN PATENT DOCUMENTS

7-13091  1/1995  Japan .

Primary Examiner—Phan T. H. Palmer
Attorney, Agent, or Firm—Lacasse & Associates; Randy W. Lacasse; Wesley L. Strickland

[57] ABSTRACT

A small-size large-capacity optical switch in which the switch switching control structure is simple and the switch switching efficiency is excellent. A plurality of fiber accommodating grooves (4) are formed on a grooved board (1) and stationary side optical fibers (5) are held and aligned in the fiber accommodating grooves (4) to form a fiber array unit (8). The fiber array units (8) are laminated with a space therebetween. A master fiber (10) is arranged so as to correspond to the fiber array unit (8) of each stage and the master fiber (10) of each stage is supported and secured by a common master fiber supporter (12). Movement of the master fiber supporter (12) is controlled by fiber movement control means (13) only in a direction in which the fiber accommodating grooves (4) are aligned. When the master fiber (10) is moved to a position directly above the fiber accommodating groove (4) accommodating the stationary side optical fiber (5) to be connected to the master fiber (10), by pushing the master fiber (10) to the fiber accommodating groove (4) and holding it, the master fiber 10 is connected to the stationary side optical fiber (5) to be connected to the master fiber (10).

10 Claims, 7 Drawing Sheets

OPTICAL SWITCH

TECHNICAL FIELD

The present invention relates to an optical switch for selectively switching the connection between a plurality of aligned optical fibers and a master optical fiber by moving the master optical fiber for switching with respect to the aligned optical fibers.

BACKGROUND ART

As an optical switch for selectively switching the connection between a plurality of aligned optical fibers and a master fiber, one is known that is disclosed in Japanese Laid-open Patent Publication No. Hei-6-208045. In the conventional optical switch, a plurality of boards where a plurality of groove are formed so as to be aligned are laminated with a space therebetween. In the grooves of each board, optical fibers are inserted partway and secured. On this side of the lamination of the boards, one master optical fiber is provided so that its movement in the X direction in which the grooves of each board are aligned, in the Z direction in which the boards are laminated and in the Y direction along the length of the grooves may be controlled by conveying means. By controlling the movement of one master fiber, the master fiber is inserted in a target groove of a board to thereby switch the connection of the optical fibers by use of the optical fiber to be connected to the master fiber and the groove.

However, in the conventional optical switch, since switch switching of the master fiber is performed by controlling the movement in the three axial directions, i.e. in the X direction, in the Y direction and in the Z direction by the conveying means, the control structure of the conveying means is complicated, so that the cost increases.

In addition, since the movement in the three-axial directions is necessarily controlled every time the switching of the connection is performed and the switching of the optical fibers is performed by moving one master fiber, for example, from the position of an optical fiber of the uppermost board to the position of an optical fiber of the lowermost board as described above, the movement distance of the master fiber is long, so that the time necessary for the connection switching (switch switching) of the optical fibers increases. As a result, the switching efficiency cannot be improved.

The present invention is intended for solving the above-mentioned themes and an object thereof is to provide an optical switch wherein the structure for controlling the movement of the master fiber is simplified and the efficiency of the optical fiber switching connection is greatly improved.

DISCLOSURE OF THE INVENTION

To achieve the above-mentioned object, the present invention takes the measures described below. A first aspect of the invention has the following features as measures for solving the theme: A plurality of fiber accommodating grooves are formed so as to be aligned parallel to one another on a surface of a grooved board and stationary side optical fibers are inserted in the fiber accommodating grooves partway with their end surfaces trued up to form a fiber array unit. Directly above a fiber accommodating groove line formed surface where said stationary side optical fibers are not accommodated, one or more master fibers are disposed in a direction for their connection end surfaces to be opposed to the end surfaces of the stationary side optical fibers, and are secured to a master fiber supporter. The master fiber supporter is linked to fiber movement control means for controlling movement of the master fibers only in a direction in which the fiber accommodating grooves are aligned. The master fiber supporter has a fiber pushing member for, when the master fibers are moved to positions above the fiber accommodating grooves accommodating the stationary side optical fibers to be connected to the master fibers, pushing end sides of the master fibers into the grooves and holding them to thereby perform optical connection between the master fibers and the stationary side optical fibers to be connected to the master fibers. A plurality of stages of switch mechanisms are provided which comprise a pair of the fiber array unit on a stationary side and the master fibers on a moving side.

A second aspect of the invention has the following features as measures for solving the theme: A plurality of fiber array units are laminated with a space therebetween so that the switch mechanisms are formed in a plurality of stages.

A third aspect of the invention has the following features as measures for solving the themes: The fiber array unit of the switch mechanism of each stage juts out in a direction of the fiber accommodating grooves so as to be laminated to form steps.

A fourth aspect of the invention has the following features as measures for solving the themes: The groove formed boards are disposed back to back and the fiber accommodating grooves having the stationary side optical fibers are formed so as to be aligned on both obverse and reverse surfaces of the fiber array unit of each stage. The master fibers are disposed on the fiber accommodating groove formed surface side of the obverse and reverse surfaces and two switch mechanisms on the obverse surface side and on the reverse surface side are formed for each stage.

A fifth aspect of the invention has the following features as measures for solving the themes: The master fibers of the switch mechanisms of all the stages are secured to one common master fiber supporter.

A sixth aspect of the invention has the following features as measures for solving the themes: Fiber array units pairing up with each other are disposed parallel to each other so that end surfaces of the stationary side optical fibers thereof are opposed to each other and the master fiber supporter is provided between the parallelly disposed fiber array units to form the switch mechanisms in parallel stages.

A seventh aspect of the invention has the following features as measures for solving the themes: The switch mechanisms arranged in parallel stages are laminated with a space therebetween so that the switch mechanisms are formed in a plurality of stages both in a parallel direction and in a lamination direction.

An eighth aspect of the invention has the following features as measures for solving the themes: An n×1 optical switch is provided for selectively extracting one of a plurality of inputs. The master fiber of the switch mechanism of each stage is connected to an input side of the n×1 optical switch and a signal of the master fiber of the switch mechanism of each stage is selectively switched and extracted by the n×1 optical switch.

In the invention of the above-described features, switch mechanisms comprising a pair of a fiber array unit and a master fiber are provided in a plurality of stages and movement of the master fiber provided for each switch mechanism is controlled only in the direction in which the fiber accommodating grooves are aligned.

Since the present invention is structured so that fiber array units in which a plurality of fiber accommodating grooves are formed on the grooved board and the stationary side optical fibers are held and secured in the fiber accommodating grooves are arranged in a plurality of stages and that by controlling movement of the master fiber disposed for each stage only in the direction in which the fiber accommodating grooves are aligned, switching of connection with the stationary side optical fiber to be connected to the master fiber is performed, compared with a method in which movement of the master fiber is controlled in the three axial directions like in the prior art, the master fiber movement control structure is greatly simplified. As a result, the cost of the optical switch of the present invention is reduced.

Moreover, since the master fiber is provided for the switch mechanism of each stage and an arrangement where one master fiber is moved among stationary side optical fibers of a plurality of switch mechanisms is not employed but an arrangement where the master fiber is only necessarily moved among stationary side optical fibers of its own switch mechanism is employed, compared with the prior art in which the switching of the connection with stationary optical fibers of the switching mechanism of a plurality of stages is performed by moving one common master fiber, the movement distance of the master fiber necessary for the connection switching is very short. In addition, since the master fiber control movement operation is simplified only in the direction in which the fiber accommodating grooves are aligned as described above, the time necessary for master fiber connection switching is greatly reduced. As a result, a large-capacity optical switch is provided in which switch switching efficiency is extremely high.

Further, in the arrangement where the master fibers of all the stages are supported and secured by a common master fiber supporter, since the master fibers of all the stages may be simultaneously moved through a common control operation, the structure for connection switching by the master fibers is further simplified.

Further, since the switch mechanisms of the present invention of each stage are arranged in parallel stages and in laminated stages, the switch mechanisms may be arranged in high density, so that an optical switch in which switch switching of as many as several thousands of cores of optical fibers is possible is formed to be small-sized. In particular, in the arrangement where the fiber array units are formed on both the obverse and reverse surfaces of each stage so that the switch mechanisms are formed on both the obverse and reverse surfaces of each stage, the switch mechanisms may be arranged in higher density. As a result, further size reduction of the large-capacity optical switch is achieved.

Further, in the arrangement where the output side of the master optical fiber of the switch mechanism of each stage is connected to the n×1 optical switch, a signal of the master fiber of the switch mechanism of each stage may be selectively extracted and directed to an apparatus for problem detection and inspection, so that the wiring connection of the optical line from the optical switch to the problem detection/inspection apparatus is greatly simplified.

BEST MODE FOR CARRYING OUT THE INVENTION

Figure 1:
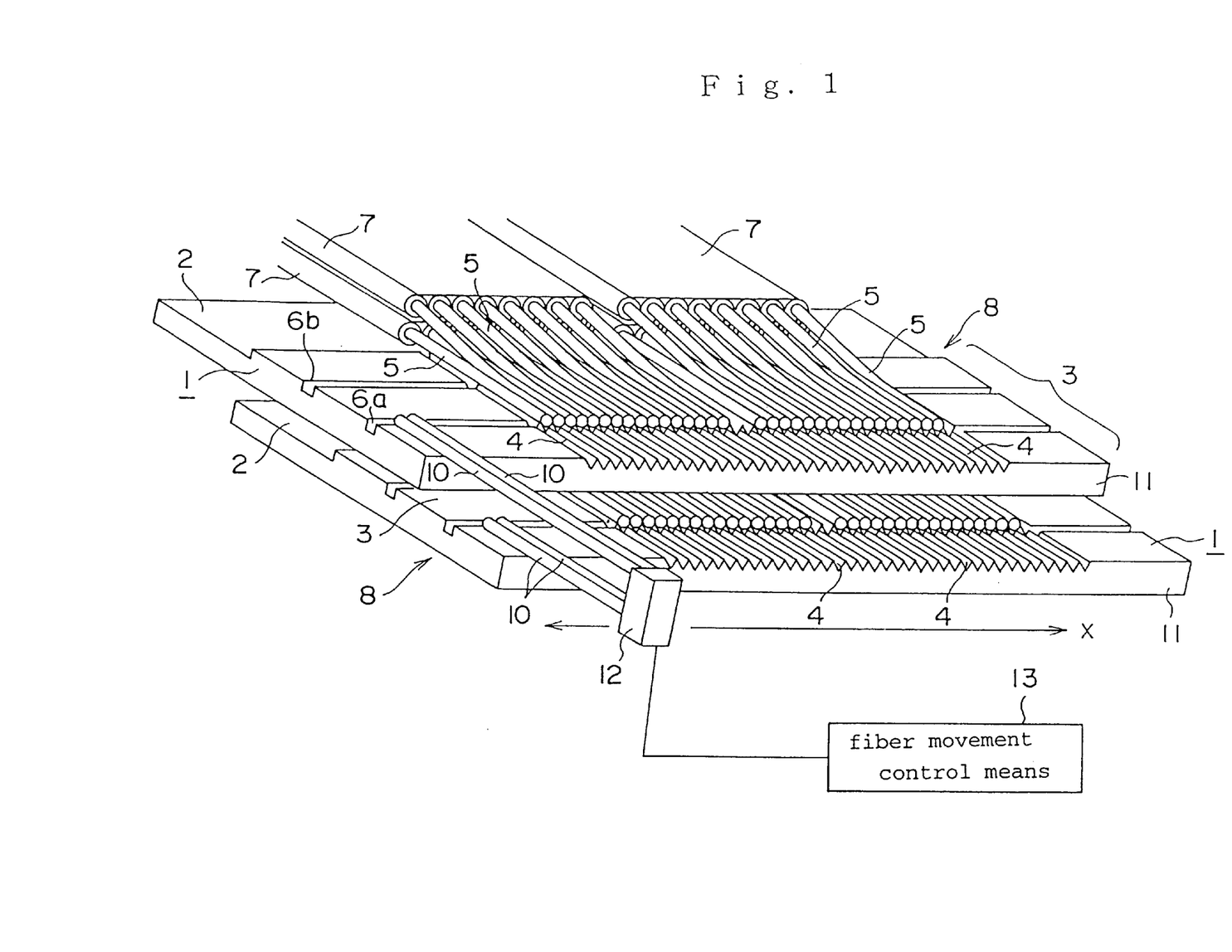
FIG. 1 is a view of assistance in explaining the structure of a first embodiment of the present invention.

To describe the present invention in more detail, it will be explained with reference to the attached drawings. FIG. 1 shows a first embodiment of an optical switch according to the present invention. In the figure, on the rear end side of a grooved board 1, a different level surface 2 is formed which has a thickness smaller than that of the board. On a thick plane surface 3 on the front side of the different level surface 2, a plurality of fiber accommodating grooves 4 being continuous over the entire width from the rear end to the front end are formed so as to be aligned in the X direction along the length of the grooved board 1.

While the fiber accommodating grooves 4 may be U-shaped, they are V-shaped in this embodiment and several hundreds of (for example, four hundred) grooves are formed on one grooved board 1.

The fiber accommodating grooves are aligned with a pitch substantially coinciding with the diameter (for example, 125 $\mu$m) of stationary side optical fibers 5 accommodated and secured in the fiber accommodating grooves 4. In this embodiment, the grooves are aligned with a pitch of 125 $\mu$m which coincides with the outer shape of the stationary side optical fibers 5. On the thick plane surface 3, grooves 6a and 6b are formed so as to vertically cross the fiber accommodating grooves 4.

Figure 2:
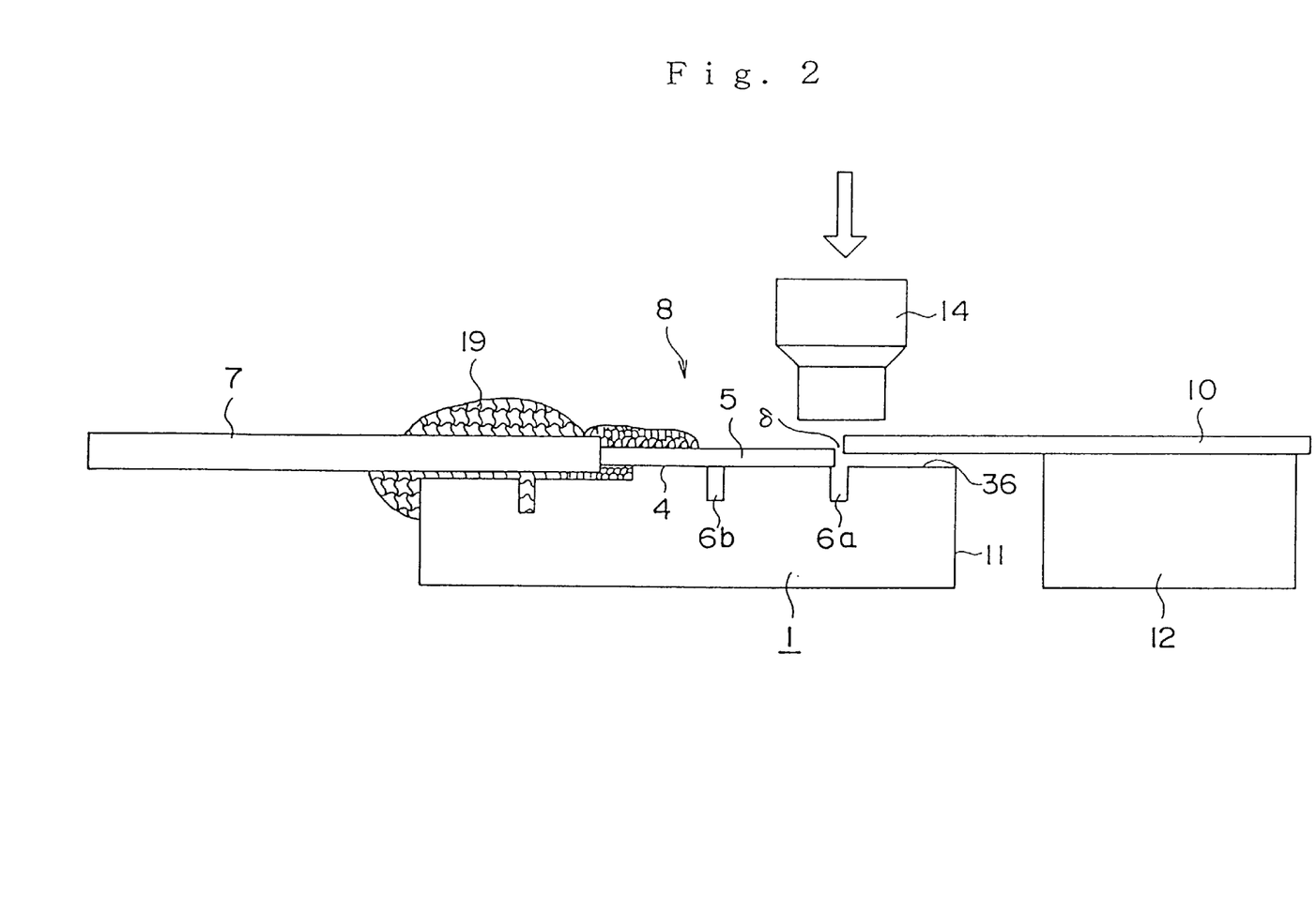
FIG. 2 is a schematic view of assistance in explaining a switching mechanism of each stage.

On the upper side of the different level surface 2 of the grooved board 1, multi-core optical tapes 7 are placed one on another and secured with an adhesive 19 as shown in FIG. 2. The stationary side optical fibers 5 exposed by removing the coating on end portions of the multi-core optical tapes 7 are pulled out to a middle of the fiber accommodating grooves 4, in this case, to the position of the groove 6a so that the optical fibers of the lower side multi-core optical tape 7 and the optical fibers of the upper side multi-core optical tape 7 are adjacent to each other, and are held in the fiber accommodating grooves 4 with the end surfaces of the stationary side optical fibers 5 being trued up. As shown in FIG. 2, the stationary side optical fibers 5 are secured in the fiber accommodating grooves with the adhesive 19, etc., and the grooved board 1 and the stationary side optical fibers 5 held and secured in the fiber accommodating grooves 4 of the grooved board 1 constitute a fiber array unit 8.

On the front side of the grooved board 1, one or more (two in FIG. 1) master fibers (master optical fibers) 10 are disposed. The master fibers 10 are disposed parallel to the fiber accommodating grooves 4. End sides (connection end sides) of the master fibers 10 are disposed directly above groove formed surface 36 of fiber accommodating grooves 4 with a very small space therebetween as shown in FIG. 2. The other end sides of the master fibers 10 are secured to a master fiber supporter 12 in a position frontwardly away from an end surface 11 of the grooved board 1.

The master fiber supporter 12 is linked to fiber movement control means 13 and movement-controlled only in the X direction which is the direction in which the fiber accommodating grooves 4 are aligned. The length of the protrusion of the master fibers 10 from the master fiber supporter 12 is set so that when the master fibers 10 are moved to positions opposed to the end surfaces of the stationary side optical fibers 5, a very small space δ is left between the end surfaces of the master fibers 10 and the end surfaces of the stationary side optical fibers 5 in order to avoid contact between the fibers.

The master fiber supporter 12 has a fiber pushing member 14 for performing optical connection between the master fibers 10 and the stationary side optical fibers 5 to be connected to the master fibers 10 by, when the master fibers 10 are moved to positions above the fiber accommodating grooves 4 holding the stationary side optical fibers 5 to be connected to the master fibers 10, pushing the end sides of the master fibers 10 into the fiber accommodating grooves 4 and holding the master fibers 10.

Figure 7:
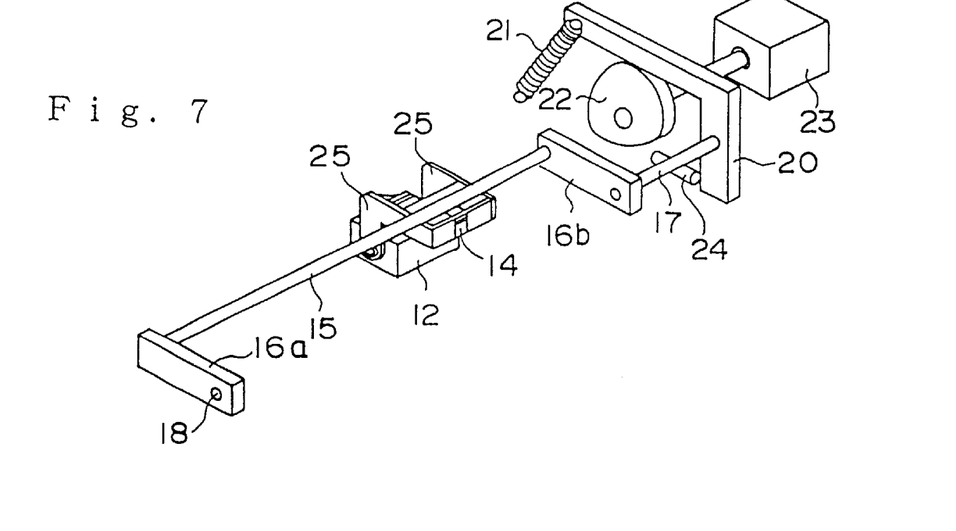
FIG. 7 is a view of assistance in explaining a fiber pushing mechanism.
Figure 8A:
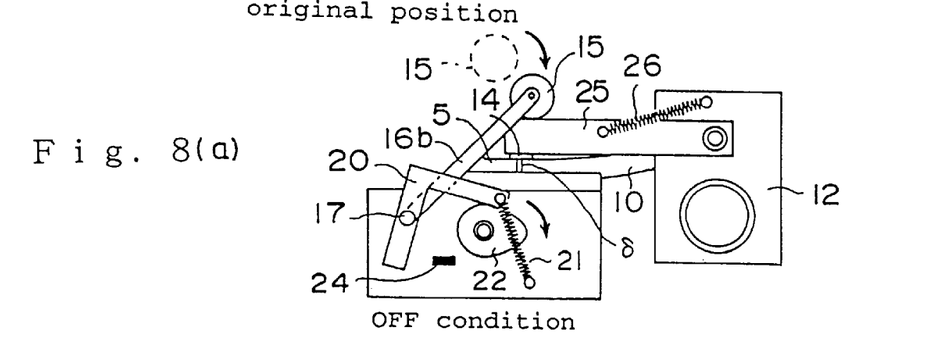
FIGS. 8(a) and (b) are a view of assistance in explaining fiber pushing and releasing operations performed by the fiber pushing mechanism.
Figure 8B:
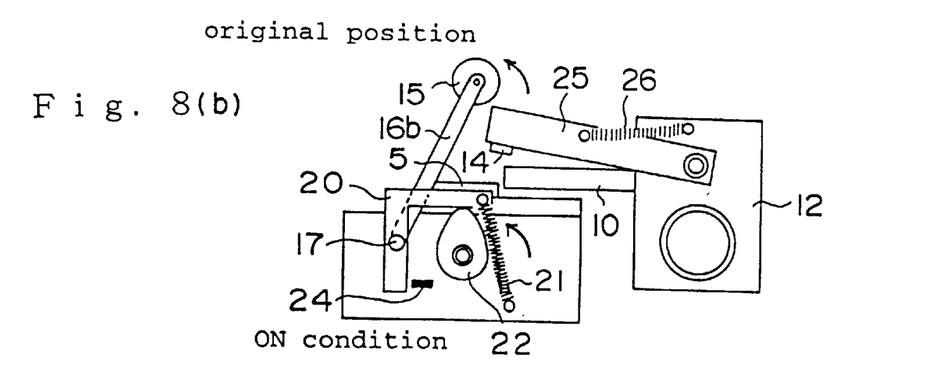

FIG. 7 shows an operation principle of a fiber pushing mechanism for performing fiber pushing and releasing operations of the fiber pushing member 14. FIGS. 8(a) and (b) show the behavior of the fiber pushing and releasing operations of the fiber pushing mechanism.

A rod 15 shown in FIG. 7 is disposed so as to be situated on the upper side of the grooved board 1 substantially along the groove 6a shown in FIG. 1 and to bridge over the grooved board 1 in the direction in which the grooves are aligned. The both ends of the rod 15 are supportedly secured to arms 16a and 16b. In a hole 18 on the lower end side of the arm 16a, a non-illustrated pin shaft is secured and the pin shaft is rotatably attached to a non-illustrated side frame wall, etc. of the optical switch. The lower end side of the other arm 16b is coupled to one end side of a shaft 17. The other end side of the shaft 17 is secured to an L-shaped follower frame 20 so as to protrude out of the follower frame 20. The end of the protruding portion of the shaft 17 is rotatably attached to a non-illustrated side frame wall, etc. on the opposite side of the optical switch.

One end side of the follower frame 20 is coupled to one end side of a compression spring 21 so that the follower frame 20 is normally pushed in a counterclockwise direction. The follower frame 20 is linked to a cam 22. The cam 22 is enabled to make reciprocating rotation by a pulse motor 23. Following the rotation of the cam 22, the follower frame 20 rotates about the shaft 17 together with the shaft 17. The rotation amount (rotation angle) of the follower frame 20 is detected by a proximity sensor 24 disposed so as to be opposed to the follower frame 20.

On the lower side of the rod 15, the master fiber supporter 12 is situated. To the master fiber supporter 12, an arm 25 is rotatably attached. To an end side of the arm 25, the fiber pushing member 14 is attached. To the arm 25, an end of a spring 26 (FIGS. 8(a) and (b)) are coupled for normally pushing the arm 25 in a retracting direction (direction in which the fiber pushing member 14 is separated from the master fibers 10).

In the fiber pushing mechanism, as shown in FIG. 8(a), by rotating the cam 22 by a predetermined amount in the direction of the arrow, the follower frame 20 rotates in a clockwise direction of FIGS. 8(a) and (b) following the rotation of the cam 22, thereby rotating the arm 25 in a counterclockwise direction of FIGS. 8(a) and (b) in a direction for the rod 15 to push the fiber pushing member 14 downward the direction of the fiber accommodating grooves 4). By the rotation of the arm 25, the fiber pushing member 14 pushes the master fibers 10 into the fiber accommodating grooves 4 to thereby perform the optical connection between the master fibers 10 and the stationary side optical fibers 5 to be connected to the master fibers 10.

When the cam 22 is rotated to the original position as shown in FIG. 8(b), the follower frame 20 rotates in a Counterclockwise direction of FIGS. 8(a) and (b) so that the rod 15 releases the pushing condition of the fiber pushing member 14. By the releasing of the pushing condition, the arm 25 rotates in a pushing releasing direction by the resiliency of the spring 26, the fiber pushing member 14 is separated from the master fibers 10 and retracted and the master fibers 10 are pulled out of the fiber accommodating grooves 4 to release the optical connection with the stationary side optical fibers 5, so that the master fibers 10 are movable to the next stationary side optical fibers to be connected to the master fibers 10.

In this embodiment, a switch mechanism is constituted by a pair of the master fibers 10 and the fiber array unit 8 in which the stationary side optical fibers 5 are aligned and secured in the fiber accommodating grooves 4 of the grooved board 1.

As shown in FIG. 1, in this embodiment, the fiber array units 8 are laminated one on another with a space therebetween so that the switch mechanisms are arranged in upper and lower two stages (needless to say, the switch mechanisms are arranged in three or more stages according to the number of switching cores of the optical fibers).

In the structure of FIG. 1, the lower side grooved board 1 juts out toward this side (the right side of FIG. 1) from the upper side grooved board 1 so that the upper and lower fiber array units 8 form a step. While the master fibers 10 of the upper side switch mechanism and the master fibers 10 of the lower side switch mechanism may be supported by different master fiber supporters, in the example shown in FIG. 1, the master fibers 10 of the upper side switch mechanism and the master fibers 10 of the lower side switch mechanism are supported and secured by one common master fiber supporter 12. The upper and lower side master fibers 10 are both movement-controlled by common fiber movement control means 13.

In the optical switch of this embodiment, by moving the master fiber supporter 12 in the X direction by the fiber movement control means 13, the master fibers 10 are moved to positions directly above the fiber accommodating grooves 4 accommodating the stationary side optical fibers 5 to be connected to the master fibers 10.

Then, by driving the fiber pushing mechanism so as to operate from the condition of FIG. 8(b) to the condition of FIG. 8(a), the master fibers are inserted and accommodated in the target fiber accommodating grooves 4, so that the optical connection (optical signal propagation connection) with the stationary side optical fibers 5 to be connected to the master fibers 10 is achieved.

When connection switching of the master fibers 10 to another stationary side optical fibers 5 is performed, by operating the fiber pushing mechanism from the condition of FIG. 8(a) to the condition of FIG. 8(b) to release the pushing restraint force of the master fibers 10 and by movement-controlling the master fiber supporter 12 by the fiber movement control means 13 in a manner similar to the above-described manner, the master fibers 10 are moved to positions directly above the fiber accommodating grooves 4 accommodating the next stationary side fibers 5 to be connected to the master fibers 10. Then, by performing the fiber pushing operation of the fiber pushing mechanism, connection switching (switch switching) of the target master fibers 10 is achieved.

According to this embodiment, the master fibers 10 are provided for the switch mechanism of each stage, the master fibers 10 may be moved to the positions of the stationary side fibers to be connected to the master fibers 10 by movement-controlling the master fibers 10 of each stage only in the direction in which the fiber accommodating grooves are aligned (X direction) and the movement control of the master fibers in the three axial directions like in the prior art is unnecessary, so that the control structure of the fiber movement control means 13 of the master fibers 10 is extremely simplified. As a result, the cost of the optical switch is reduced.

In addition to the advantage that the movement control operation of the master fibers 10 is simplified, it is only necessary for the master fibers 10 to move between fiber accommodating grooves formed on one board and the fiber accommodating grooves are formed so as to be aligned with a very small pitch which substantially coincides with the outer diameter of the stationary side fibers 5, so that even when connection switching of several hundreds of cores of stationary side optical fibers is performed, the movement distance of the master fibers 10 is short. As a result, the time necessary for the switching connection between the master fibers 10 and the stationary side fibers 5 is greatly reduced (the efficiency of the switch switching is improved).

Further, the grooved boards 1 are laminated with a space therebetween and the master fibers 10 of one switch mechanism and the master fibers 10 of the other switch mechanism are supported by the common master fiber supporter 12 so that the master fibers 10 of a plurality of stages of the switch mechanisms are simultaneously conveyed and movement-controlled. Consequently, compared with a method in which the master fibers 10 of each switch mechanism are independently movement-controlled, the control structure of the fiber movement control means is further simplified.

In addition, by supporting the master fibers 10 of a plurality of stages by the common master fiber supporter 12, the overall size of the switch mechanism in the direction of lamination is small compared with a case where the master fiber supporter is provided for the switch mechanism of each stage. With this feature together with the above-mentioned feature that the fiber accommodating grooves 4 are closely formed, an optical switch in which connection switching of as many as several thousands of cores of stationary side optical fibers 5 is possible is formed to be small-sized.

Moreover, in the switch mechanism formed to have a plurality of stages, the fiber pushing member 14 is provided for each stage, and by driving the fiber pushing mechanisms of all the stages for performing the fiber pushing and releasing operations of the fiber pushing members 14 by a common drive source (pulse motor 23), the overall size and the cost of the optical switch apparatus are greatly reduced.

Figure 3:
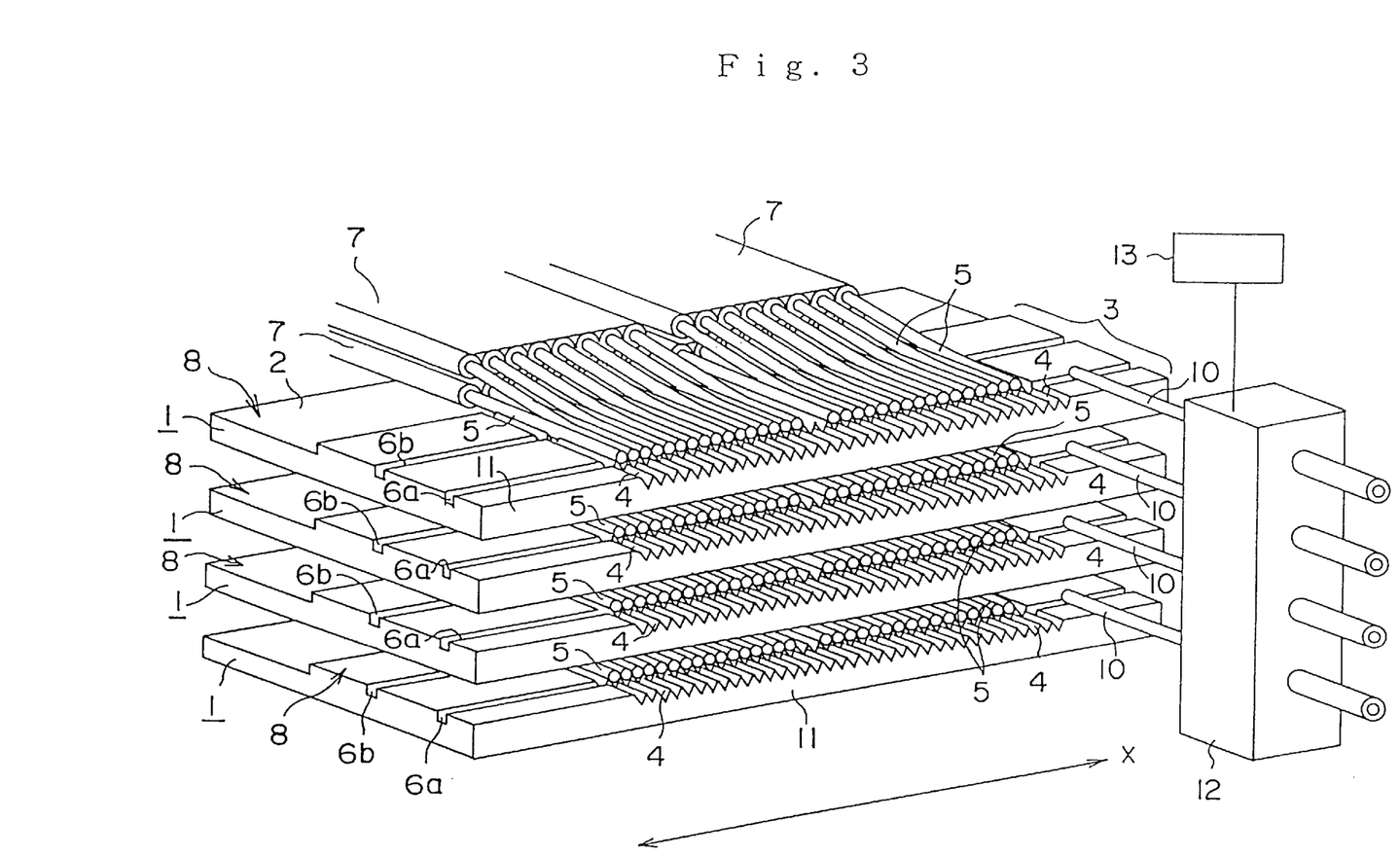
FIG. 3 is a view of assistance in explaining the structure of a second embodiment of the present invention.

FIG. 3 shows a second embodiment of the present invention. The second embodiment is different from the above-described first embodiment in that, in order that the switch mechanisms are arranged in a plurality of stages, the fiber array units 8 are not laminated so that one fiber array unit 8 juts out to form a step but the fiber array units 8 are laminated so as to be placed one on another with a space therebetween. The structure of the other portion is the same as that of the first embodiment. The second embodiment produces effects similar to those of the first embodiment.

Figure 4:
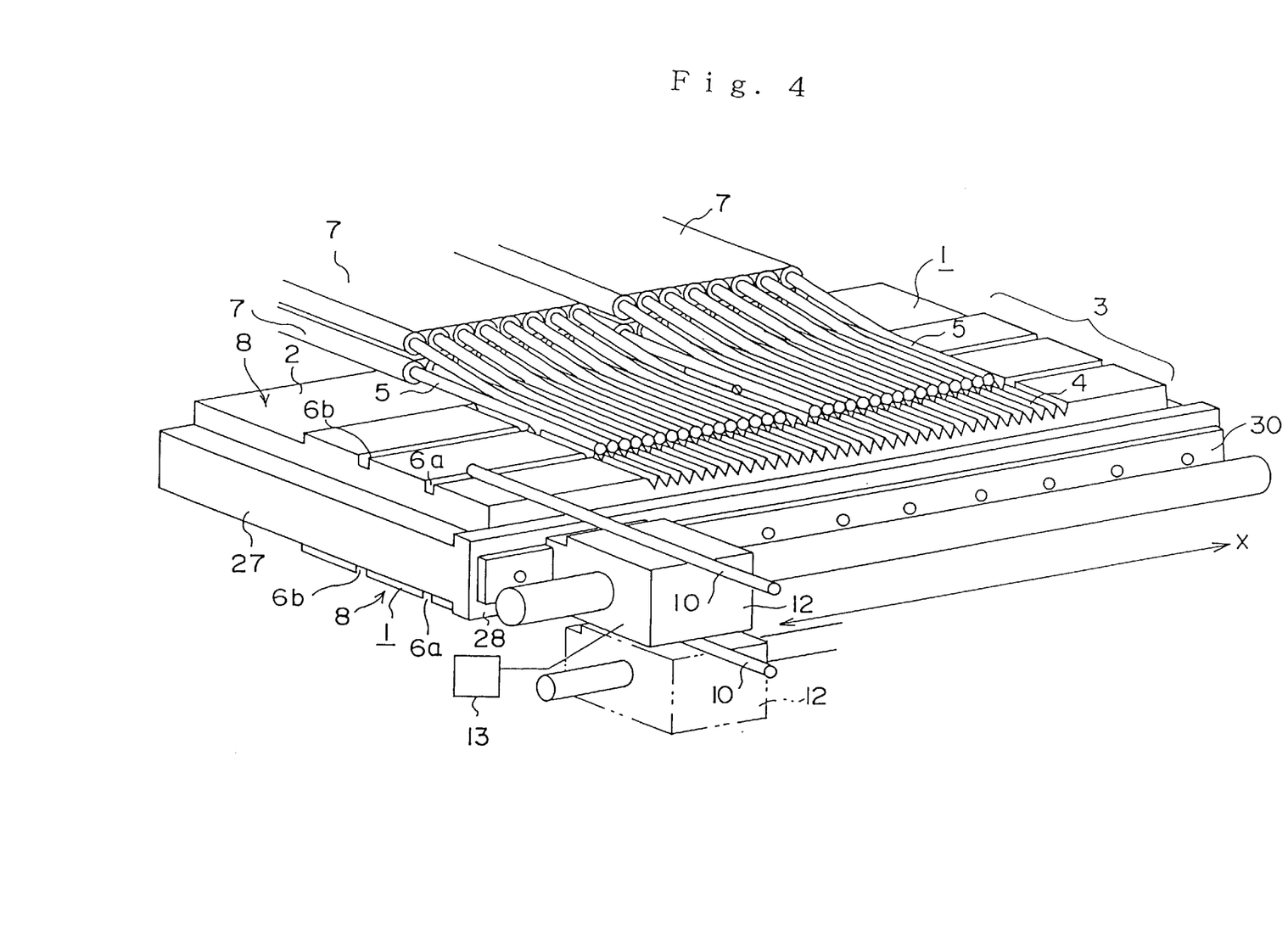
FIG. 4 is a perspective structural view of a third embodiment of the present invention.

FIG. 4 shows a third embodiment. In the third embodiment, the grooved board 1 having the same structure as those of the first and second embodiments is secured to both of the obverse and reverse surface sides of a base board 27, that is, the fiber array units 8 are secured back to back. The master fibers 10 are secured to the master fiber supporters 12 in positions directly above the fiber accommodating grooves of the obverse and reverse surface sides. By movement-controlling the master fiber supporters 12 by the fiber movement means 13 in the X direction (direction in which the fiber accommodating grooves are aligned) like in the first and second embodiments, the connection switching of the master fibers 10 and the stationary side optical fibers 5 is achieved.

In the third embodiment, by laminating in a plurality of stages the base boards 27 with a space therebetween where the fiber array units 8 are provided on the obverse and reverse sides as necessary, two switch mechanisms on the obverse and reverse sides are formed for each stage.

While not shown in FIG. 4, the fiber pushing mechanism is also provided in this embodiment like in the first and second embodiments. In this embodiment, a linear guide 30 is secured to a front end surface 28 of the base board 27 in the X direction and the master fiber supporter 12 makes a reciprocating motion in the X direction by being guided by the linear guide 30.

While in the example shown in FIG. 4, the obverse side and reverse side master fibers 10 are secured to the common master fiber supporter 12 and by the movement of the master fiber supporter 12, the obverse side and reverse side master fibers 10 are simultaneously moved, two master fiber supporters 12 may be provided for one base board 27 as shown by the chain line. In this case, the obverse side master fibers 10 are supported and secured by one master fiber supporter 12 and the reverse side master fibers 10 are supported and secured by the other master fiber supporter 12 so that the obverse side and reverse side master fibers 10 are movement-controlled by the different master fiber supporters 12. However, when the obverse side and reverse side master fibers 10 are supported by the common master fiber supporter 12, the structure of the apparatus is more simplified.

When the base boards 27 where the fiber array units 8 are formed on the obverse and reverse sides are laminated in a plurality of stages with a space therebetween, the master fiber supporter 12 may be provided for each stage. However, by providing one master fiber supporter common to the master fibers 10 of all the stages so that the master fibers 10 of all the stages are simultaneously movement-controlled, the structure of the apparatus is more simplified.

When the switch mechanisms shown in FIG. 4 are laminated in a plurality of stages, the fiber array unit (base board) of each stage may jut out so as to form a step like in the first embodiment or the fiber array units may be laminated without jutting out like in the second embodiment.

While in the example shown in FIG. 4, the base board 27 is used and the fiber array units 8 are disposed back to back on the obverse and reverse sides of the base board 27, the base board 27 may be omitted. In this case, the grooved boards 1 where the stationary side optical fibers 5 are held and secured in the fiber accommodating grooves 4 are secured back to back so that the switch mechanism is formed on each of the obverse and reverse sides.

In the third embodiment, since two switch mechanisms are formed on the obverse and reverse sides of each stage, the switch mechanisms are higher density arranged, so that the size of the optical switch apparatus is further reduced. Needless to say, effects similar to those of the first and second embodiments are produced.

Figure 5:
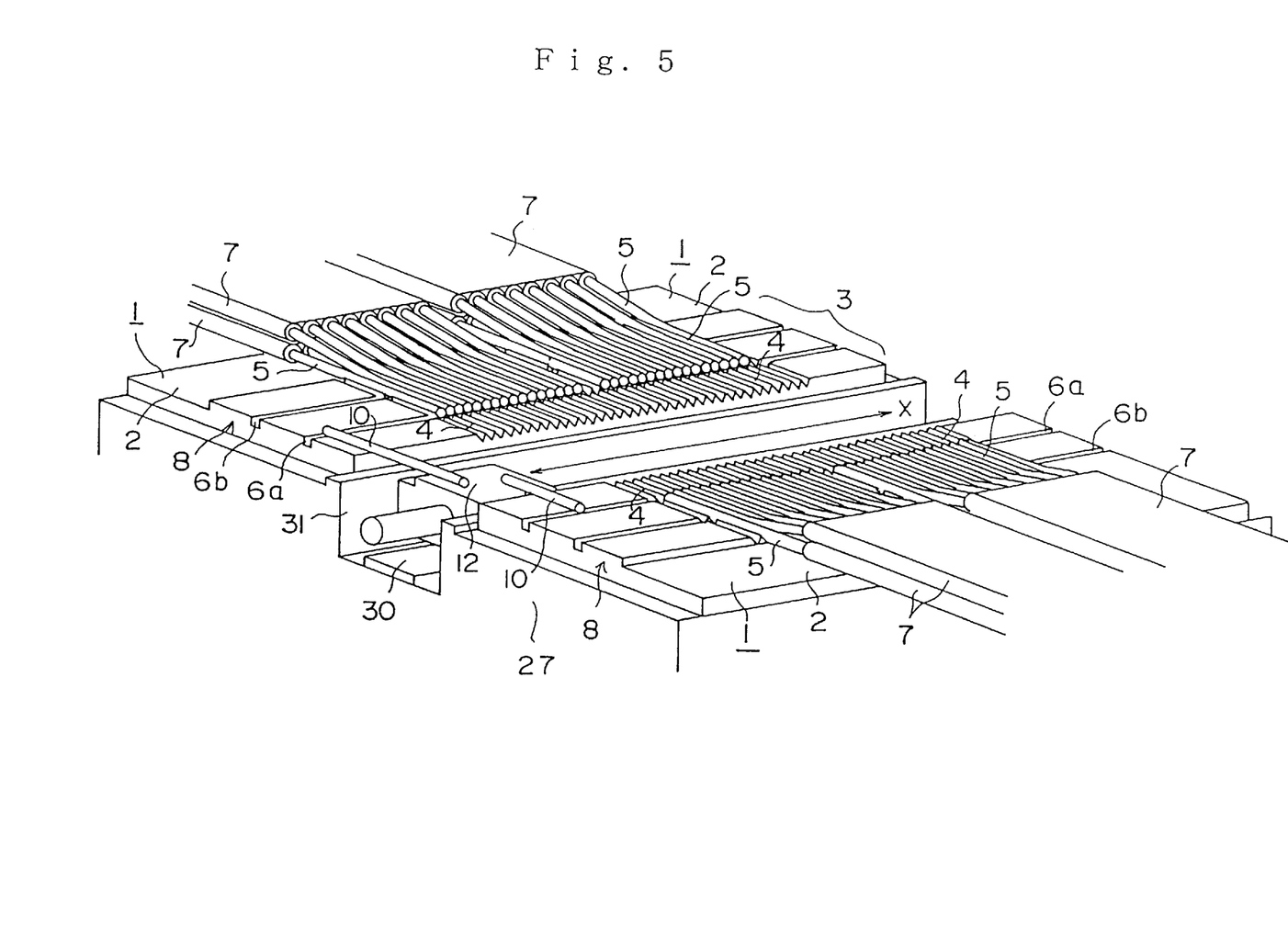
FIG. 5 is a view of assistance in explaining the structure of a fourth embodiment of the present invention.

FIG. 5 shows a fourth embodiment. In the fourth embodiment, in the middle of the baseboard 27, a concave groove 31 is formed for the master fiber supporter 12 to move in the X direction, that is, in the direction in which the fiber accommodating grooves 4 are aligned. With the concave groove 31 as the center, the fiber array units 8 are disposed on the left and right sides thereof so as to be opposed to each other and the switch mechanisms of the stages are arranged parallel to each other. The structure of the other portion of the switch mechanism is similar to those of the first to third embodiments. In the fourth embodiment, fiber movement control means 13 and a fiber pushing mechanism similar to those of the first to third embodiments are also provided.

While in the example shown in FIG. 5, the master fibers 10 of the left side and right side switch mechanisms are both supported by one master fiber supporter 12 so as to be simultaneously movement-controlled, the master fibers 10 of the left side and right side switch mechanisms may be movement-controlled by different master fiber supporters 12. However, by movement-controlling the left side and right side master fibers 10 by one master fiber supporter 12 as shown in FIG. 5, the structure of the apparatus is further simplified.

Moreover, by laminating a plurality of the switch mechanisms arranged in parallel stages as shown in FIG. 5 with a space therebetween, the switch mechanisms are arranged in a plurality of stages both in the parallel direction and in the lamination direction, so that a large-capacity optical switch in which connection switching of several thousands of cores of stationary side optical fibers 5 is possible is formed to be small-sized. The fourth embodiment also produces effects similar to those of the first to third embodiments.

Figure 6:
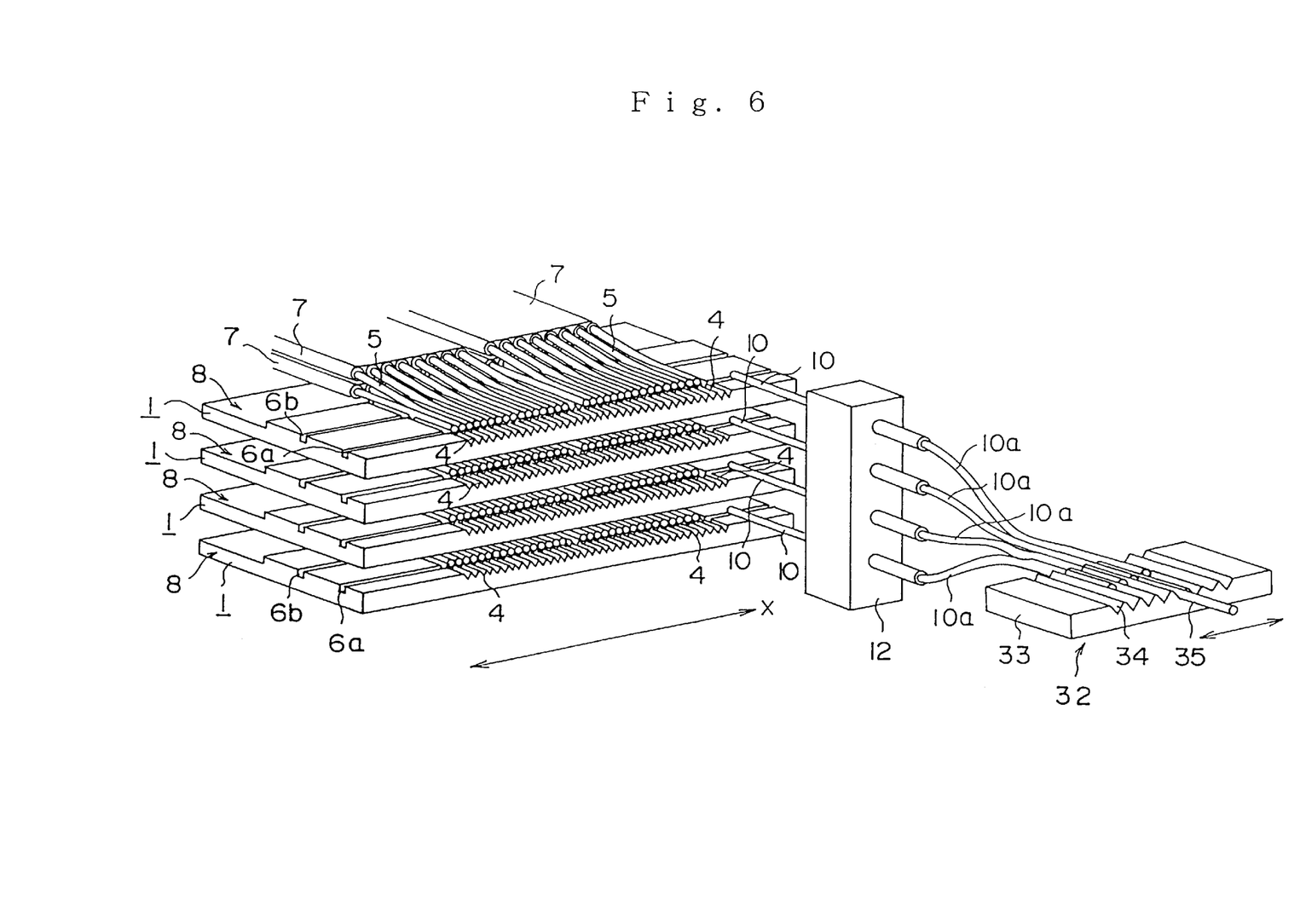
FIG. 6 is a view of assistance in explaining the structure of a fifth embodiment of the present invention.

FIG. 6 shows a fifth embodiment. In the fifth embodiment, a signal output side terminal of the master fiber 10 of each of a plurality of stages of switch mechanisms is connected to an n×1 optical switch 32. The n×1 optical switch 32 is an optical switch having n (n is an integer equal to or greater than 2) inputs and one output. On a board 33, a plurality of fiber grooves 34 are formed so as to be aligned and an output terminal 10a of the master fiber 10 of each stage is inserted into the groove partway and secured with its end surface being trued up to the end surfaces of the other output terminals 10a. By movement-controlling a signal extracting fiber 35 in the direction in which the fiber grooves 34 are aligned, switching of connection with the master fiber 10 of each stage is selectively performed by use of the fiber grooves 34 to extract a signal on the master fibers 10 of each stage by the switch switching.

The plurality of stages of switch mechanisms are applied to, in addition to the lamination type shown in FIG. 6, various types of switch mechanisms as shown in the above-described first to fourth embodiments such as the one in which the switch mechanisms are arranged in parallel stages and the one in which the fiber array units 8 jut out to form steps, and the master fiber 10 of the switch mechanism of each stage is connected to the n×1 optical switch 32 to thereby selectively perform the signal extraction of the switch mechanism of each stage.

While the stationary side optical fibers 5 in the above-described embodiments are, for example, fibers connected being branched from optical fibers for performing subscriber optical communication, etc. and the master fiber 10 (in the example shown in FIG. 6, the signal extracting fiber 35) is directed to an inspecting apparatus such as OTDR and used for problem detection and inspection of optical fiber lines, needless to say, they are also employed as optical switches for other purposes.

By selectively extracting signals from the master fibers 10 of a plurality of stages like in the fifth embodiment, the optical fiber wiring is simplified compared with a case where the master fibers 10 of a plurality of stages are directed to an apparatus such as OTDR.

The present invention is not limited to the above-described embodiments but may have various embodiments. For example, while optical fibers of the multi-core optical tape 7 are held in the fiber accommodating grooves 4 in the above-described embodiments, optical fibers of the core of an optical cable, etc. may be held therein.

Industrial Applicability

As described above, the optical switch according to the present invention is suitable for use in a portion for effectively switching connection between a master fiber and a multiplicity of aligned optical fibers by movement-controlling the master fiber.

What is claimed is:

1. An optical switch wherein a plurality of fiber accommodating grooves are formed so as to be aligned parallel to one another on a surface of a grooved board and stationary side optical fibers are inserted in the fiber accommodating grooves partway with their end surfaces trued up to form a fiber array unit, wherein directly above a fiber accommodating groove line formed surface where said stationary side optical fibers are not accommodated, one or more master fibers are disposed in a direction for their connection end surfaces to be opposed to the end surfaces of the stationary side optical fibers, and are secured to a master fiber supporter, wherein the master fiber supporter is linked to fiber movement control means for controlling movement of the master fibers only in a direction in which the fiber accommodating grooves are aligned, wherein the master fiber supporter has a fiber pushing member for, when the master fibers are moved to positions above the fiber accommodating grooves accommodating the stationary side optical fibers to be connected to the master fibers, pushing end sides of the master fibers into the grooves and holding them to thereby perform optical connection between the master fibers and the stationary side optical fibers to be connected to the master fibers, and wherein a plurality of stages of switch mechanisms are provided which comprise a pair of the fiber array unit on a stationary side and the master fibers on a moving side.

2. An optical switch according to claim 1, wherein a plurality of fiber array units are laminated with a space therebetween so that the switch mechanisms are arranged in a plurality of stages.

3. An optical switch according to claim 2, wherein a plurality of fiber array unit of the switch mechanism of each stage juts out in a direction of the fiber accommodating grooves so as to be laminated to form steps.

4. An optical switch according to claim 3, wherein the grooved boards are disposed back to back and the fiber accommodating grooves having the stationary side optical fibers are formed so as to be aligned on both obverse and reverse surfaces of the fiber array unit of each stage, and wherein the master fibers are disposed on the fiber accommodating groove formed surface side of the obverse and reverse surfaces and two switch mechanisms on the obverse surface side and on the reverse surface side are formed for each stage.

5. An optical switch according to claim 2, wherein the grooved boards are disposed back to back and the fiber accommodating grooves having the stationary side optical fibers are formed so as to be aligned on both obverse and reverse surfaces of the fiber array unit of each stage, and wherein the master fibers are disposed on the fiber accommodating groove formed surface side of thy obverse and reverse surfaces and two switch mechanisms on the obverse surface side and on the reverse surface side are formed for each stage.

6. An optical switch according to claim 1, wherein fiber array units pairing up with each other are disposed parallel to each other so that end surfaces of the stationary side optical fibers thereof are opposed to each other and the master fiber supporter is provided between the parallelly disposed fiber array units to arrange the switch mechanisms in parallel stages.

7. An optical switch according to claim 6, wherein the switch mechanisms arranged in parallel stages are laminated with a space therebetween so that the switch mechanisms are arranged in a plurality of stages both in a parallel direction and in a lamination direction.

8. An optical switch according to claim 1, wherein an n×1 optical switch is provided for selectively extracting one of a plurality of inputs, and wherein the master fiber of the switch mechanism of each stage is connected to an input side of the n×1 optical switch and a signal of the master fiber of the switch mechanism of each stage is selectively switched and extracted by the n×1 optical switch.

9. An optical switch according to claim 1, wherein the grooved boards are disposed back to back and the fiber accommodating grooves having the stationary side optical fibers are formed so as to be aligned on both obverse and reverse surfaces of the fiber array unit of each stage, and wherein the master fibers are disposed on the fiber accommodating groove formed surface side of the obverse and reverse surfaces and two switch mechanisms on the obverse surface side and on the reverse surface side are formed for each stage.

10. An optical switch according to claim 1, wherein the master fibers of the switch mechanisms of all the stages are secured to one common master fiber supporter.

* * * * *

UNITED STATES PATENT AND TRADEMARK OFFICE
CERTIFICATE OF CORRECTION

PATENT NO. : 6,108,467　　　　　　　　　　　　　　　　　　　　Page 1 of 1
DATED : August 22, 2000
INVENTOR(S) : Naraoka et al.

It is certified that error appears in the above-identified patent and that said Letters Patent is hereby corrected as shown below:

Column 9,
Line 2, "baseboard" should read -- base board --.

Signed and Sealed this

Eleventh Day of December, 2001

Attest:

NICHOLAS P. GODICI
Attesting Officer　　　Acting Director of the United States Patent and Trademark Office

UNITED STATES PATENT AND TRADEMARK OFFICE
CERTIFICATE OF CORRECTION

PATENT NO. : 6,108,467
DATED : August 22, 2000
INVENTOR(S) : Naraoka et al.

It is certified that error appears in the above-identified patent and that said Letters Patent is hereby corrected as shown below:

Title page,
Item [73], please correct the name of the second Assignee listed to read -- Nippon Telegraph and Telephone Corporation, --.

Column 9
Line 2, "baseboard" should read -- base board --.

Signed and Sealed this

Twenty-seventh Day of May, 2003

JAMES E. ROGAN
*Director of the United States Patent and Trademark Office*